(12) United States Patent
Moyer

(10) Patent No.: US 7,734,898 B2
(45) Date of Patent: Jun. 8, 2010

(54) SYSTEM AND METHOD FOR SPECIFYING AN IMMEDIATE VALUE IN AN INSTRUCTION

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1223 days.

(21) Appl. No.: 10/944,310

(22) Filed: Sep. 17, 2004

(65) Prior Publication Data

US 2006/0064445 A1    Mar. 23, 2006

(51) Int. Cl.
*G06F 9/00* (2006.01)
(52) U.S. Cl. ..................................... 712/210
(58) Field of Classification Search ................. 712/210
See application file for complete search history.

(56) References Cited

U.S. PATENT DOCUMENTS

| | | | |
|---|---|---|---|
| 5,867,681 A * | 2/1999 | Worrell et al. ............. 712/208 |
| 6,308,258 B1 * | 10/2001 | Kubota et al. ............. 712/210 |
| 6,430,684 B1 | 8/2002 | Bosshart | |
| 6,958,718 B2 * | 10/2005 | Symes et al. ............. 341/106 |
| 2002/0032851 A1 * | 3/2002 | Kyker et al. ............. 712/211 |
| 2003/0046516 A1 | 3/2003 | Cho | |
| 2003/0097543 A1 | 5/2003 | Wishneusky | |
| 2003/0101209 A1 * | 5/2003 | Kyker et al. ............. 709/1 |
| 2003/0200426 A1 * | 10/2003 | Lee et al. ............. 712/241 |
| 2004/0024992 A1 * | 2/2004 | Ku ............. 712/210 |
| 2004/0168043 A1 | 8/2004 | Keller et al. | |

FOREIGN PATENT DOCUMENTS

WO    WO 00/70446    11/2000

* cited by examiner

*Primary Examiner*—Eric Coleman
(74) *Attorney, Agent, or Firm*—Robert L. King

(57) ABSTRACT

A data processing system uses a data processor instruction that forms an immediate value. The data processing instruction uses a first field as a portion of the immediate value. A second field of the data processing instruction determines a positional location of the portion of the immediate value within the immediate value. A bit value in a third field of the data processing instruction is used to determine a remainder of the immediate value.

15 Claims, 3 Drawing Sheets

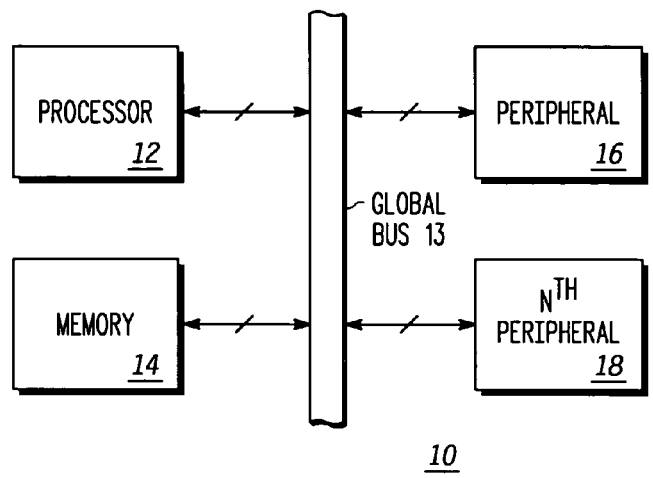
FIG. 1
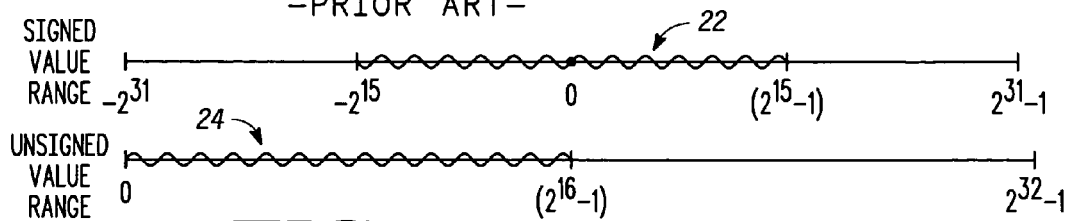
FIG. 2
—PRIOR ART—
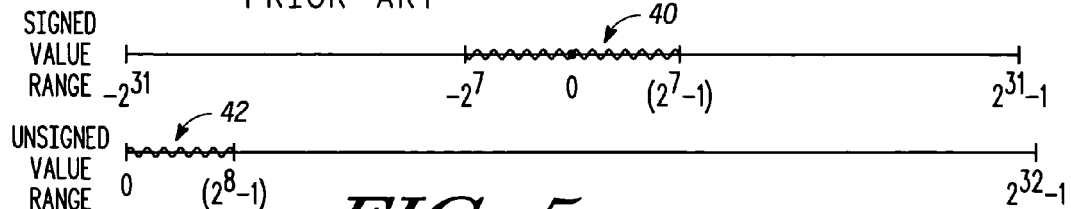
FIG. 3
—PRIOR ART—
FIG. 4
—PRIOR ART—
FIG. 5
—PRIOR ART—

SYSTEM AND METHOD FOR SPECIFYING AN IMMEDIATE VALUE IN AN INSTRUCTION

FIELD OF THE INVENTION

The present invention relates to a data processing system, and more particularly, to data processing instruction formats for a data processing system.

RELATED ART

As data processing systems have evolved, the amount of memory that is provided on an integrated circuit remains a very limited system resource. The overall width or number of bits of a particular processor's instructions affects the number of instructions which will fit within the available capacity of the system memory that stores the instructions. Therefore, design compromises are made as to what and how much functionality is used with the limited number of instruction bits. Once an instruction format is selected, decode logic is implemented specific for the selected format. The individual bits of a processor instruction are interpreted by decode logic. An opcode field portion of an instruction defines a type of processor operation the instruction implements. An address field portion of the instruction contains an address of a register containing an operand.

An alternative way of providing an operand for processing is the use of an "immediate operand". An immediate operand uses a predetermined instruction field such as the address field of an instruction to store the actual operand. Therefore, the length of an immediate operand is limited by the width of a portion of an instruction of the processing system. Within a fixed length instruction, the available space to store an immediate operand is limited because the wider the immediate operand becomes, the fewer instruction bits there are for other instruction specifiers.

A known method to increase the size of an immediate operand, such as to a thirty-two bit immediate operand, is to use two separate instructions. For example, a first instruction contains a sixteen bit immediate operand and loads the immediate into a high bit order portion of a register. A second and different type of instruction contains another sixteen bit immediate operand and adds its immediate operand to the low bit order portion of the register, thereby forming a single thirty-two bit immediate operand from the two instructions. This method however requires the execution of two distinct instructions which is time consuming and requires processor resources to be committed to this function during execution of each of the two instructions.

BRIEF DESCRIPTION OF THE DRAWINGS

The present invention is illustrated by way of example and not limited by the accompanying figures, in which like references indicate similar elements, and in which:

FIG. 1 illustrates in block diagram form a data processing system for use with the present invention;

FIG. 2 illustrates in diagrammatic form a known data processing instruction format;

FIG. 3 illustrates in diagrammatic form another known data processing instruction format;

FIG. 4 illustrates in diagrammatic form a range of possible signed and unsigned immediate operand values for the known instruction format of FIG. 2;

FIG. 5 illustrates in diagrammatic form a range of possible signed and unsigned immediate operand values for the known instruction format of FIG. 3;

Figure 6:
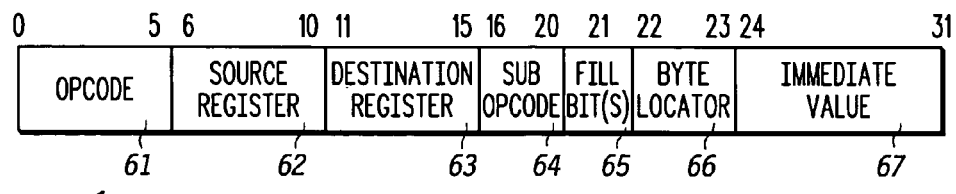
FIG. 6 illustrates in diagrammatic form a data processing instruction in accordance with the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The terms "assert" and "negate" are used when referring to the rendering of a signal, bit, or similar apparatus into its logically true or logically false state, respectively. If the logically true state is a logic level one, the logically false state is a logic level zero. Furthermore, the memory described herein may be any type of memory, such as, for example, a read-only memory (ROM), a random access memory (RAM), static random access memory (SRAM), non-volatile memory (e.g. Flash), and MRAM, etc.

FIG. 1 illustrates, in block diagram form, a data processing system 10 generally having a processor 12 connected by one or more multiple bit conductors to a global communication bus 13. Processor 12 can be any of numerous types of data processors including a central processing unit (CPU), a floating point unit, a digital signal processor (DSP), etc. A memory 14 is connected via one or more multiple bit conductors to the global communication bus 13. The memory 14 is one of any type of memory storage devices, including random access memory (RAM), read only memory (ROM), disk storage, registers and storage tables, etc. Connected to the global communication bus 13 is a plurality of N peripherals, where N is an integer. For example a first peripheral 16 and an Nth peripheral 18 are connected to the global communication bus 13.

In operation, the processor 12 functions to execute a plurality of instructions have a predetermined format. As processor 12 executes the instructions, the memory 14 is accessed to retrieve operands in the form of addresses and data and to store such information in the memory 14. Peripherals, such as peripheral 16, function to implement various functions, such as direct memory access control (DMAC). Memory 14 also functions to store various data processing instructions to be executed by processor 12.

Illustrated in FIG. 2 is a known instruction format for a data processing instruction. The data processing instruction has thirty-two bits as indicated by bits 0 through 31. Six bits are dedicated to an operational code, hereinafter 'opcode', which serves to define the function in a data processing system that the instruction implements. Five bits, bits six through ten, are dedicated to a source register field. The source register field functions to define a source register to obtain information for implementing the function defined by the opcode. Five more bits, bits eleven through fifteen, are dedicated to a destination register field. The destination register field functions to define a destination register to transfer information to in connection with implementing the function defined by the opcode. A remaining sixteen bits, bits sixteen through thirty-one, are used to define an immediate value. Therefore, the instruction of FIG. 2 is limited to having sixteen bit immediate values. If a thirty-two bit immediate value is desired, two instructions must be executed in two instruction cycles wherein the immediate value from each instruction is used and combined to form a thirty-two bit immediate value.

Illustrated in FIG. 3 is yet another known instruction format for a data processing instruction. Again, this data processing instruction has thirty-two bits as indicated by bits 0 through 31. Six bits are again dedicated to the opcode, which serves to define the function in a data processing system that the instruction implements. Five bits, bits six through ten, are again dedicated to a source register field. The source register field functions to define a source register to obtain information for implementing the function defined by the opcode. Five more bits, bits eleven through fifteen, are again dedicated to a destination register field. The destination register field functions to define a destination register to transfer information to in connection with implementing the function defined by the opcode. Eight additional bits, bits sixteen through twenty-three, are provided to function as a sub opcode which is an additional opcode field. The sub opcode field, in conjunction with the opcode field, functions to further define the function for the instruction to implement. In other words, the sub opcode may be used to select a sub-function for the instruction operation. The remaining eight bits of the instruction, bits twenty-four through thirty-one, are used to define an immediate value. Therefore, the instruction of FIG. 2 is limited to having eight bit immediate values. If a thirty-two bit immediate value is desired, multiple instructions must again be executed in multiple instruction cycles wherein the immediate value from each instruction is used and combined to form a thirty-two bit immediate value.

Illustrated in FIG. 4 in diagrammatic form is a range of possible signed and unsigned immediate operand values for the known instruction format of FIG. 2. A plurality of signed values 22 is centered about the value of zero. The immediate operand values that may be designated by the sixteen bit field of the instruction of FIG. 2 are continuous from $-2^{15}$ through $(2^{15}-1)$ over an entire range from $-2^{31}$ to $(2^{31}-1)$ if all thirty-two bits of the instruction were available for an immediate operand value. A plurality of unsigned values 24 starts at zero and extends to $(2^{16}-1)$ over an entire range of $2^{32}$ values if all thirty-two bits of the instruction were available for an immediate operand value. Thus, for either signed or unsigned immediate operands, the instruction format of FIG. 2 provides a continuous range of possible immediate operand values which spans a subset of the range of possible 32-bit values.

Illustrated in FIG. 5 in diagrammatic form is a range of possible signed and unsigned immediate operand values for the known instruction format of FIG. 3. A plurality of signed values 40 is centered about the value of zero. The immediate operand values that may be designated by the eight-bit field of the instruction of FIG. 2 are continuous from $-2^7$ through $(2^7-1)$ over an entire range from $-2^{31}$ to $(2^{31}-1)$ if all thirty-two bits of the instruction were available for an immediate operand value. Therefore, the range of values for the plurality of signed values 40 is smaller than the range of values for the plurality of signed values 22 of FIG. 4 since the immediate value field size of the instruction of FIG. 3 is half the number of bits of the immediate value field size of the instruction of FIG. 2. A plurality of unsigned values 42 starts at zero and extends to $(2^8-1)$ over an entire range of $2^{32}$ values if all thirty-two bits of the instruction were available for an immediate operand value. For either signed or unsigned immediate operands, the instruction format of FIG. 3 also provides a continuous range of possible immediate operand values.

Illustrated in FIG. 6 in diagrammatic form is a data processing instruction 60 having an instruction field format in accordance with one of numerous possible forms of the present invention. A first field of six bits is an opcode field 61. A second field of five bits is a source register field 62. A third field of five bits is a destination register field 63. A fourth field of five bits is a sub opcode field 64. A fifth field of one (or more) bit(s) is a Fill Bit(s) field 65. A sixth field of two bits is a Byte Locator field 66. A seventh field of eight bits is an immediate value field 67.

In operation, data processing instruction 60 functions to use the opcode field 61 and sub opcode field 64 to define the instruction's function. The immediate value field 67 is used to implement the formation of a thirty-two bit or greater bit size immediate value in a single instruction execution with the assistance of the fill bit field 65 and the byte locator field 66. In particular, the fill bit field 65 defines a bit value, one or zero, to fill in as bit values for the immediate value of desired size that is not specified by the immediate value field. The byte locator field 66 functions to define which byte location that the immediate value in immediate value field 67 is put into. All other byte locations of the immediate value are filled with the bit value contained in the fill bit(s) field 65. When multiple bits are implemented in the fill bit(s) field 65, each of the multiple fill bit specifies a bit value for a predetermined byte of the immediate value. In another form, the multiple fill bits may collectively be used as a value to be replicated in each byte of the immediate value other than the byte containing the value from the immediate value field 67.

Figure 7:
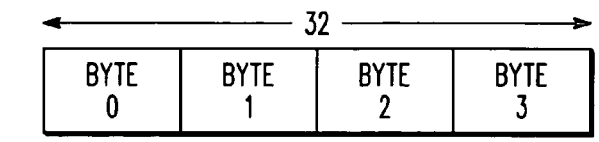
FIG. 7 illustrates in diagrammatic form immediate operand byte ordering as specified by the byte locator of FIG. 6.

Illustrated in FIG. 7 is an example immediate value 70 having four bytes of eight bits each. Since the byte locator field 66 is two bits, any of the four bytes (byte 0, byte 1, byte 2 and byte 3) may be designated by the byte locator field 66. In operation, the byte locator field 66 defines which of the bytes the value in the immediate value field 67 is placed into. All other bytes will be filled by the value of the fill bit(s) 65.

Figure 8:
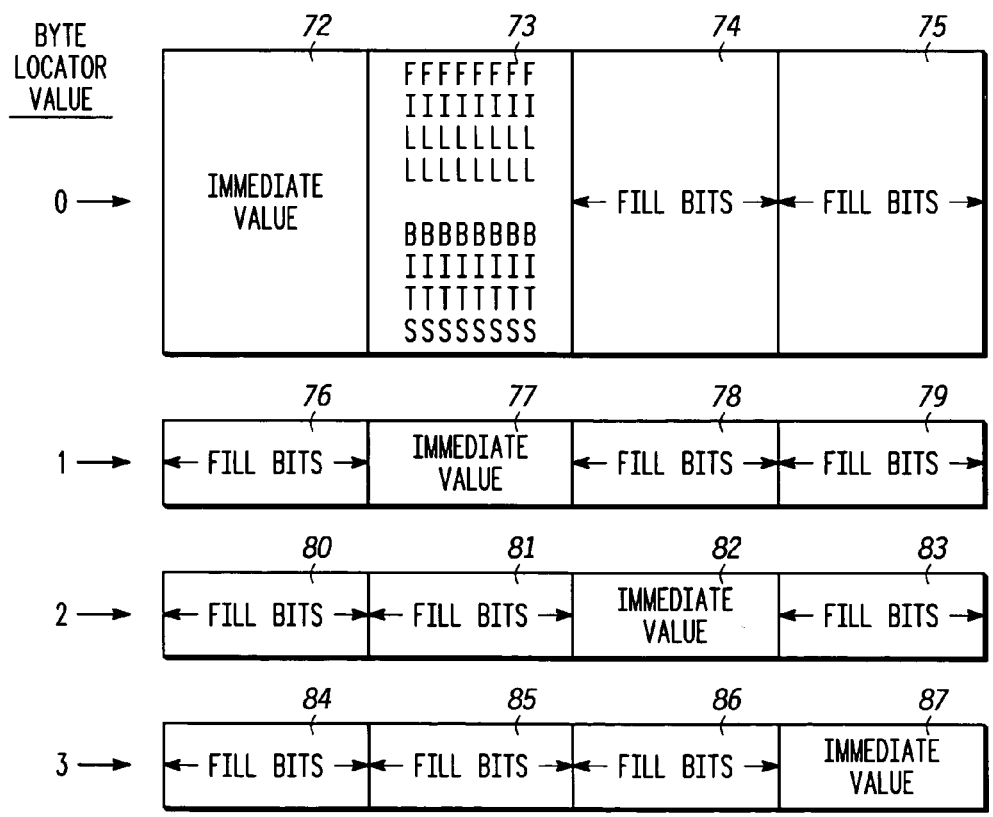
FIG. 8 illustrates in diagrammatic form four immediate operands having byte ordering arranged as specified by the byte locator of FIG. 6.

Illustrated in FIG. 8 are four examples based on the immediate value operand being placed into different byte fields. When the byte locator value 0 is designated by byte locator field 66, the immediate value is placed in byte 72. Fill bits, having the value defined by fill bit field 65, are placed in byte 73, byte 74 and byte 75. When the byte locator value 1 is designated by byte locator field 66, the immediate value is placed in byte 77. Fill bits, having the value defined by fill bit field 65, are placed in byte 76, byte 78 and byte 79. When the byte locator value 2 is designated by byte locator field 66, the immediate value is placed in byte 82. Fill bits, having the value defined by fill bit field 65, are placed in byte 80, byte 81 and byte 83. When the byte locator value 3 is designated by byte locator field 66, the immediate value is placed in byte 87. Fill bits, having the value defined by fill bit field 65, are placed in byte 84, byte 85 and byte 86.

Figure 9:
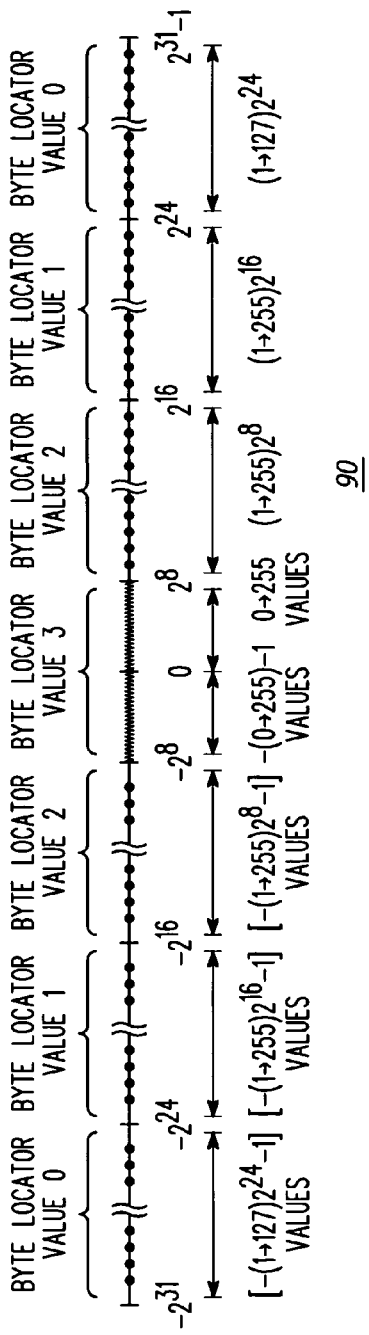
FIG. 9 illustrates in diagrammatic form a range of signed immediate operand values that are available with the data processing instruction of FIG. 6.

FIG. 9 illustrates in diagrammatic form a range 90 of the signed immediate operand values which can be specified by the instruction format of FIG. 6. It should be noted there are both a continuous range of values and a large range of values outside of the continuous range that are non-continuous. The value of a predetermined bit of the immediate value in the immediate value field 67 determines whether the immediate value is positive or negative. Consistent with the byte ordering nomenclature of FIG. 7, byte 3 represents the least significant byte and byte 0 represents the most significant byte. When the immediate value in immediate value field 67 is placed in byte 3 as specified by byte locator field 66, the values that may be specified by the immediate value are continuous from $-2^8$ to $2^8-1$ since the immediate value is represented by eight bits. In this case, because a specific fill bit value is used for byte values two, one and zero, the fill bit value determines the sign of the final immediate value. When the byte locator field 66 indicates a byte location other than 3 for the immediate value field 67, because a specific fill bit value is used for the remaining byte values, only specific values, as indicated by the dots in FIG. 9 may be specified by the combined value of bytes three, two, one and zero. Therefore, a continuous range of immediate values within byte locator value 2, byte locator value 1 and byte locator value 0 is not provided.

As an example, data processing instruction 60 implements positive values 0 through 255 within byte locator value 3. Data processing instruction 60 implements 255 values within the byte locator value 2 from $2^8$ up to $2^{16}$. Those 255 values are respectively the values of one through two hundred fifty-five multiplied by $2^8$. Data processing instruction 60 implements 255 values within the byte locator value 1 from $2^{16}$ up to $2^{24}$. Those 255 values are respectively the values of one through two hundred fifty-five multiplied by $2^{16}$. Data processing instruction 60 implements 127 values within the byte locator value 0. Those 127 values are respectively the values of one through one hundred twenty-seven multiplied by $2^{24}$.

Data processing instruction 60 implements negative values −1 through $-2^8$ within byte locator value 3. Data processing instruction 60 implements 255 values in the range from negative $2^8$ through negative $2^{16}$ within the byte locator value 2 for negative values. Those 255 values are respectively the values of negative one through negative two hundred fifty-five multiplied by $2^8$ minus one. Data processing instruction 60 implements 255 values within the byte locator value 1 for negative values in the range from negative $2^{16}$ through negative $2^{24}$. Those 255 values are respectively the values of negative one through negative two hundred fifty-five multiplied by $2^{16}$ minus one. Data processing instruction 60 implements 127 values within the byte locator value 0 for negative values. Those 127 values are respectively the values of negative one through negative one hundred twenty-seven multiplied by $2^{24}$ minus one.

Therefore, it should be noted that specific immediate values have been specified over a wide range outside of a range of $2^8$ positive and negative continuous values. For many applications it is preferable to implement a limited number of immediate values over a wider range of values, even though the wider range of values is not characterized as a range of continuous values. For example, instead of only implementing a continuous range of immediate values between minus $2^{16}$ to positive $2^{16}$, for example, data processing instruction 60 functions to reduce the range of continuous values to expand the total range of immediate values that may be specified by a data processing instruction.

Figure 10:
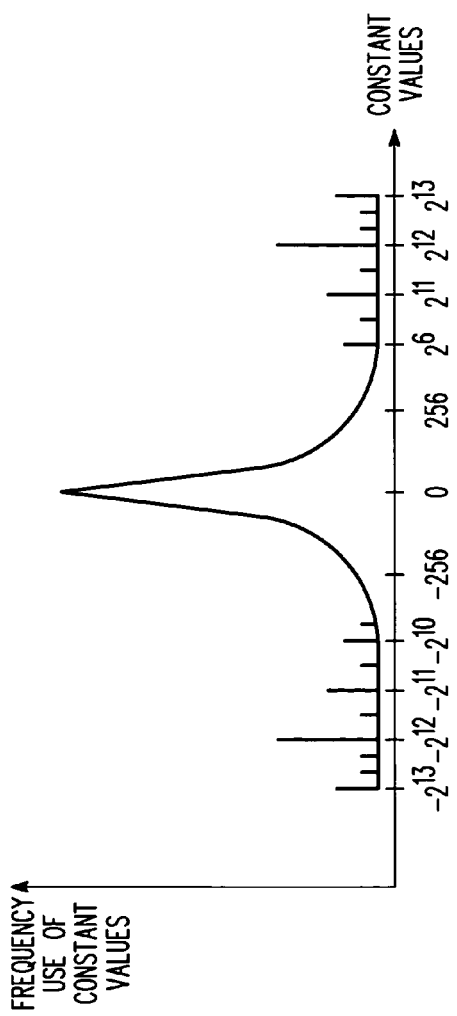
FIG. 10 illustrates in graphical form a plot of the frequency of use with respect to specific constant values.

Illustrated in FIG. 10 is a graph that illustrates, by way of example only, a possible distribution of immediate constant values in an exemplary data processing system with respect to the frequency of use of the immediate constant values. It should be noted from FIG. 10 that while the most commonly used immediate values are within a continuous range, positive and negative, around the value zero, there is a non-negligible recurrence of values out to plus and minus $2^{13}$ and beyond. Therefore, the ability to use some of the limited encodings for an eight bit immediate value for values that extend out to the values is significant. Otherwise, at least two instructions requiring two instruction cycles or extended instruction execution would be required to create such values. While the present performance is gained at the expense of reducing somewhat the range of continuous values which extend out from zero, it should be noted in FIG. 10 that the frequency of use of immediate values greater than plus or minus 256 drops off noticeably with the exception of certain immediate constant values in close proximity to powers of two.

By now it should be appreciated that there has been provided a data processing instruction format for use in a data processing system that efficiently specifies immediate values. Additionally, a method for encoding immediate values in a data processing instruction is provided. Because immediate values consume a large portion of available opcode space, the flexible mechanism for encoding a range of useful values in a single instruction described herein is significant. An eight-bit instruction immediate value is placed in a byte position that is indicated by the value of the byte locator field and all remaining bit positions in remaining bytes are filled with a bit value of one or more fill bits. In the illustrated form of data processing instruction 60, eleven bits of opcode and sub-opcode are implemented to define the operation of the instruction and a remaining instruction portion is dedicated to implementing the additional functionality required to form the immediate value with the information in the one or more fill bit(s) field, the byte locator field and the immediate value field. Therefore, useful immediate values may be generated using a limited number of opcode bits. Opcode density is improved for a data processing instruction set and increased programming flexibility is achieved while using a limited number of opcodes.

In one form there has been provided a method in a data processing system of forming an immediate value. A data processing instruction is received. A first field of the data processing instruction is used as a portion of the immediate value. A second field of the data processing instruction is used to determine a positional location of the portion of the immediate value within the immediate value. A bit value in a third field of the data processing instruction is used to determine a remainder of the immediate value. In one form the bit value in the third field of the data processing instruction is used by filling all bit positions of the immediate value not filled by the first field of the data processing instruction in the portion of the immediate value with the bit value. In another form a first portion of the third field of the data processing instruction is used to fill a first portion of all bit positions of the immediate value not filled by the first field. A second portion of the third field of the data processing instruction is used to fill a second portion of the all bit positions of the immediate value not filled by the first field. In another form the second field of the data processing instruction is used to determine a byte position within the immediate value. In yet another form a fourth field of the data processing instruction is provided as an opcode field to define a function of the data processing instruction and a fifth field of the data processing instruction is provided as a sub opcode field to implement operations to create the immediate value.

In another form there is herein provided a data processing system having a communication bus. A processor is coupled to the communication bus, the processor executing a plurality of data processing instructions. A memory is coupled to the communication bus, the memory storing the plurality of data processing instructions wherein at least one of the plurality of data processing instructions functions to form an immediate value. The at least one of the plurality of data processing instructions includes a first field that contains a portion of the immediate value. A second field determines a positional location of the portion of the immediate value within the immediate value. A third field determines all remaining bits of the immediate value. A bit value in the third field of the data processing instruction is used to fill all bit positions of the immediate value not filled by the first field of the data processing instruction. A first bit value in the third field of the data processing instruction is used to fill a first portion of all bit positions of the immediate value not filled by the first field of the data processing instruction. A second bit value in the third field of the data processing instruction is used to fill a second portion of all bit positions of the immediate value not filled by the first field of the data processing instruction. In another form the second field of the data processing instruction determines a byte position within the immediate value. In yet another form the at least one of the plurality of data processing instructions further include a fourth field of the data processing instruction that functions as an opcode field to define a function of the data processing instruction. In another form there is provided a fifth field of the data processing instruction that functions as a sub-opcode field to implement operations which use the immediate value.

It should be apparent that various modifications may be made to the disclosed embodiments. For example, although the immediate values of FIG. 9 are illustrated as being symmetric about the value of zero, other values may be chosen as a point of symmetry. While specific bit size fields are discussed having a byte locator, an eight bit unsigned immediate value and a fill bit to define a thirty-two bit immediate value, other bit sizes, either larger or smaller, may be implemented. Various data processor and coprocessor architectures may be implemented using the method described herein. The data processing system described herein is defined to include any system that processes instructions in order to form an immediate value. Additionally, the order of the bits of the immediate value stored in the data processing instruction may be in reverse order or an alternate order from the order used to create the immediate value.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. In a data processing system, a method of forming an immediate value comprising:

receiving a data processing instruction at an input of a processor;

the processor using a first field of the same data processing instruction as a portion of the immediate value;

the processor using a second field of the same data processing instruction to determine a positional location of the portion of the immediate value within the immediate value; and the processor using a bit value in a third field of the same data processing instruction to determine a remainder of the immediate value.

2. The method of claim 1 further comprising:

the processor using the bit value in the third field of the same data processing instruction by filling all bit positions of the immediate value not filled by the first field of the same data processing instruction in the portion of the immediate value with the bit value.

3. The method of claim 1 further comprising:

the processor using a first portion of the third field of the same data processing instruction to fill a first portion of all bit positions of the immediate value not filled by the first field; and the processor using a second portion of the third field of the same data processing instruction to fill a second portion of the all bit positions of the immediate value not filled by the first field.

4. The method of claim 1 further comprising:

the processor using the second field of the same data processing instruction to determine a byte position within the immediate value.

5. The method of claim 1 further comprising:

the processor using a fourth field of the same data processing instruction as an opcode field to define a function of the same data processing instruction; and the processor using a fifth field of the same data processing instruction as a sub opcode field to implement operations to create the immediate value.

6. A data processing system comprising:

a communication bus;

a processor coupled to the communication bus, the processor executing a plurality of data processing instructions; and a memory coupled to the communication bus, the memory storing the plurality of data processing instructions wherein one of the plurality of data processing instructions functions to form an immediate value, the one of the plurality of data processing instructions comprising:

a first field that contains a portion of the immediate value;

a second field that determines a positional location of the portion of the immediate value within the immediate value; and a third field that determines all remaining bits of the immediate value.

7. The data processing system of claim 6 wherein a bit value in the third field of the data processing instruction is used to fill all bit positions of the immediate value not filled by the first field of the data processing instruction.

8. The data processing system of claim 6 wherein a first bit value in the third field of the data processing instruction is used to fill a first portion of all bit positions of the immediate value not filled by the first field of the data processing instruction; and wherein a second bit value in the third field of the data processing instruction is used to fill a second portion of all bit positions of the immediate value not filled by the first field of the data processing instruction.

9. The data processing system of claim 6 wherein the second field of the data processing instruction determines a byte position within the immediate value.

10. The data processing system of claim 6 wherein the one of the plurality of data processing instructions further comprise:
- a fourth field of the data processing instruction that functions as an opcode field to define a function of the data processing instruction; and
- a fifth field of the data processing instruction that functions as a sub-opcode field to implement operations which use the immediate value.

11. A data processing system having execution means for executing instructions and memory means for storing data, the execution means executing a predetermined one of the instructions to form an immediate value by:
- using a first field of the predetermined one of the instructions to obtain a portion of the immediate value;
- using a second field of the predetermined one of the instructions to obtain a positional location of the portion of the immediate value within the immediate value; and
- using a third field of the predetermined one of the instructions to obtain all remaining bits of the immediate value.

12. The data processing system of claim 11 wherein a bit value in the third field of the predetermined one of the instructions is used by the execution means to fill all bit positions of the immediate value not filled by the first field of the predetermined one of the instructions.

13. The data processing system of claim 11 wherein a first bit value in the third field of the predetermined one of the instructions is used by the execution means to fill a first portion of all bit positions of the immediate value not filled by the first field of the predetermined one of the instructions; and
- wherein a second bit value in the third field of the predetermined one of the instructions is used by the execution means to fill a second portion of all bit positions of the immediate value not filled by the first field of the predetermined one of the instructions.

14. The data processing system of claim 11 wherein the execution means uses the second field of the predetermined one of the instructions to determine a byte position within the immediate value.

15. The data processing system of claim 11 wherein the execution means uses a fourth field of the predetermined one of the instructions as an opcode field to define a function of the predetermined one of the instructions, and uses a fifth field of the predetermined one of the instructions as a sub-opcode field to implement operations which use the immediate value.

\* \* \* \* \*